3,631,083
MAGNESIUM-ALUMINUM COMPLEXES OF POLY-HYDROXY COMPOUNDS AND THEIR PREPARATION
Ludwig A. Hartmann, Wilmington, Del., assignor to Atlas Chemical Industries Inc., Wilmington, Del.
No Drawing. Filed Apr. 24, 1970, Ser. No. 31,750
Int. Cl. C07f 5/06
U.S. Cl. 260—448 AD     20 Claims

ABSTRACT OF THE DISCLOSURE

Magnesium-aluminum complexes of polyhydroxy compounds are prepared by reacting a magnesium alkoxide and an aluminum alkoxide with a polyhydroxy compound such as sorbitol in the presence of water.

---

This invention relates to magnesium-aluminum complexes of polyhydroxy compounds and to their preparation by reacting a magnesium alkoxide and an aluminum alkoxide with a polyhydroxy compound in the presence of water. These complexes are useful as antacids and may be used in the same manner as magnesium hydroxide. They are also useful as catalysts in organic reactions where a basic catalyst is used such as in isomerizations, for example, the isomerization of glucose and fructose.

My related applications of the same filing date titled "Method of Preparing Aluminum Complexes of Polyhydroxy Compounds" and "Magnesium Complexes of Polyhydroxy Compounds and Their Preparation," Ser. Nos. 31,749 and 31,751, respectively, may be referred to for additional information in this area.

THE ALKOXIDES

Magnesium and aluminum alkoxides are well known; they may be prepared, for example, by reacting magnesium or aluminum with a monohydric alcohol. The preferred magnesium alkoxides have the formula $Mg(OR)_2$ and the preferred aluminum alkoxides have the formula $Al(OR)_3$ where R is alkyl to $C_4$ as these alkoxides are easily obtained. Magnesium ethoxide and aluminum isopropoxide are preferred because of their availability. Mixtures of magnesium alkoxides and/or aluminum alkoxides are also contemplated.

THE POLYHYDROXY COMPOUND

The polyhydroxy compound is an organic compound having at least two hydroxyl groups. The preferred polyhydroxy compounds, which are more readily available, have from 3 to 6 carbon atoms and are linear or branched, preferably linear, and preferably have 2 to 6 hydroxyl groups which may be vicinal or in a 1,3-relationship to each other. Suitable polyhydroxy compounds include propylene glycol, 1,2-, 1,3-, and 2,3-butylene glycols, 1,2-, 1,3-, 2,3-, and 2,4-pentylene glycols, 1,2-, 1,3-, 2,3-, and 2,4-hexylene glycols, glycerol, butanetriols, pentanetriols, hexanetriols, erythritol, pentanetetrols, hexanetetrols, xylitol, hexanepentols, sorbitol, mannitol, and dulcitol. Sorbitol is preferred because it is readily available. Also contemplated are polymers of polyhydroxy compounds such as hydroxyl bearing polyethers, e.g., diglycerol, polyglycerols, etc., and mixtures of polyhydroxy compounds.

THE COMPLEX

The complex preferably has a ratio about 0.1 to about 0.8 gram atoms of magnesium and aluminum to each hydroxyl group of the polyhydroxy compound. Ratios outside of this range may result in large amounts of unreacted ingredients, polymeric structures, or the dilution of the magnesium and aluminum in the complex to a level where the complex becomes less effective.

The atomic ratio of magnesium to aluminum in the complex is between about 0.05 to about 10 and is preferably between about 0.5 to about 2. Complexes having the preferred ratio of magnesium to aluminum make better antacids, since they have faster reactivity and a longer duration of pH above 3 as determined by the method of Holbert, Noble, and Grote, J. Amer. Pharm. Assoc. (Sci. Ed.), vol. 37, p. 292.

The exact structure of the complex produced is not known. However, it is believed that the following formula represents a typical complex:

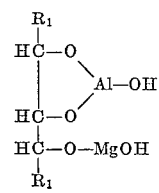

where $R_1$ is hydrogen, alkyl, or hydroxyl substituted alkyl.

THE REACTION

The reaction of the magnesium and aluminum alkoxides and the polyhydroxy compounds should be carried out in the presence of water. This amount of water, in moles per gram atom of magnesium and aluminum, is equal to about 6 to about 18 (preferably about 12) times the number of gram atoms of magnesium and aluminum charged divided by the number of hydroxyl equivalents of polyhydroxy compound charged. The use of water in excess of this amount results in the formation of magnesium and aluminum hydroxides accompanied by a considerable amount of unreacted polyhydroxy compound, while the use of insufficient water results in an incomplete reaction of the magnesium and aluminum alkoxides. The amount of water, in moles per gram atom of magnesium and aluminum, is preferably equal to about 6 to about 12 times the number of gram atoms of magnesium and aluminum charged divided by the number of hydroxyl equivalents of polyhydroxy compound charged when the ratio of gram atoms of magnesium and aluminum to each hydroxyl group of the polyhydroxy compound in the complex is about 0.1 to about 0.5 and is about 12 to about 18 times the number of gram atoms of magnesium and aluminum charged divided by the number of hydroxyl equivalents of polyhydroxy compound charged when the above ratio is about 0.5 to about 0.8; this is preferred because the hydroxyl groups on the polyhydroxy compound tend to reduce the need for water.

As the reaction proceeds and the reaction mixture thickens, enough water-miscible solvent may be added to dilute the mixture so that it may be easily stirred. Dioxane, methyl Cellosolve, alcohols such as methanol, ethanol, propanol, or isopropanol, etc., are examples of suitable solvents; alcohols are preferred as they are inexpensive, easily distilled, and the polyhydroxy compounds are very soluble in them. The temperature of the reaction is not critical, but about 70° C. is preferred.

After the alkoxide and the polyhydroxy compound have reacted to form the complex, the complex is dried. This is preferably done by vacuum treating under slightly reduced pressure at about 55 to about 90° C.

While the drying step removes the excess alcohol, it does not remove the alcohol which is attached to the complex in the form of unreacted alkoxide. This alcohol is stripped from the complex by vacuum distilling under less than 1 millimeter of mercury with thorough agitation and preferably to about 55° C. to about 90° C. (below 55° C. too much time is required to make the process practical and above 90° C. the complex tends to decompose).

EXAMPLES

The following examples further illustrate this invention, Example I being the preferred example:

EXAMPLE I

A two-liter flask equipped with an air-driven stirrer and thermometer and a reflux condenser was charged with 14.6 gms. magnesium turnings, 150 ml. absolute ethanol, 30 ml. xylene, and 1 ml. carbon tetrachloride. The mixture was stirred and heated to 75° C. on a steam bath and was then diluted with 100 ml. ethanol and refluxed at 75° C. for 19 hours. Then 750 ml. ethanol and 122.6 gms. aluminum isopropoxide were added at 70° C.; after 30 minutes all solids were dissolved. A solution of 104 gms. of 70% aqueous sorbitol and 104 gms. of water was added at 70° C. Additional ethanol (50 ml.) was added and the slurry stirred for 23 minutes at 60–70° C. A vacuum was applied (150–200 mm.) and the solvents were removed at 50–60° C. until a moist, solid, lumpy product was obtained. The vacuum was gradually reduced to 30–50 mm. at 60–70° C. and a powdered product was obtained. During the last 6 hours the vacuum was slowly reduced to 3 mm. with slow stirring at 70–80° C. The drying was continued at that temperature for 16 hours at 0.2 mm. Stripping was carried out at 90–110° C. and 0.4 to 0.8 mm. for 12 hours. 133.3 gms. of a fine, light-colored powder was obtained. Analysis showed carbon, 22.50%; hydrogen, 4.94%; ash, 40.09%; alcohol, 1.2%; and free sorbitol, none. The approximate molar composition of the product was sorbitol (1) - aluminum(1.5) - magnesium(1.5) - inorganic hydroxyl groups(4.4) (those hydroxyl groups attached to the magnesium or the aluminum and titratable with acid are referred to herein as "inorganic").

EXAMPLE II 48.6 grams of magnesium was reacted with 500 ml. absolute ethanol in the presence of 100 ml. xylene and 4 ml. carbon tetrachloride under reflux for 24 hours. The product was a thick slurry which was diluted with 2,800 ml. absolute ethanol at 60° C. Aluminum isopropoxide (817 grams) was added at about 60° C. and the mixture stirred until a clear solution was obtained at 68° C. A solution of 364.4 grams of sorbitol in 540 grams of water was rapidly added at about 60–65° C. while vigorous stirring was maintained. The product slurry was stirred for one hour at 60–65° C. and then vacuum dried. Most of the solvent was removed at 50–70° C. at 95 mm. Hg and gradually increasing vacuum. Stripping was carried out at 70–95° C. and <1 mm. Hg for about 48 hours. The product was a fine, white powder containing no free sorbitol by gas-liquid chromatography. The yield was 714 g. The molar composition of the product was sorbitol (1)-aluminum(2) - magnesium(1) - inorganic hydroxyl groups(5.6).

EXAMPLE III 12.1 grams magnesium is reacted with 125 ml. absolute ethanol containing 25 ml. xylene and 1 ml. carbon tetrachloride at reflux for 24 hours. The product is diluted with 700 ml. absolute ethanol and 324 grams aluminum ethodixe is added at about 60° C. The clear solution is treated with a solution of 122 grams of erythritol in 390 grams of water at about 60° C. and the product is vacuum dried and stripped as in Example I. The product is a white solid containing 0.5 gram atoms magnesium, 2 gram atoms aluminum, and 1 mol of erythritol.

EXAMPLE IV 12.1 grams magnesium is treated with 750 ml. methyl alcohol containing 1 ml. carbon tetrachloride at reflux until reacted. 40.5 grams aluminum ethoxide is added at about 65° C., followed by a solution of 63 grams glycerol in 40 ml. water. The product is isolated as in Example I. It contains 2 gram atoms magnesium, 1 gram atom aluminum, and 1 mol of glycerol.

What is claimed is:

1. A magnesium-aluminum complex produced by reacting magnesium alkoxide and aluminum alkoxide with polyhydroxy compound in the presence of water.

2. A magnesium-aluminum complex according to claim 1 having a ratio of about 0.1 to about 0.8 gram atoms of magnesium and aluminum to each hydroxyl group of the polyhydroxy compound, and having an atomic ratio of magnesium to aluminum between about 0.05 to about 10, said complex being produced by reacting a magnesium alkoxide and aluminum alkoxide having the respective formulae $Mg(OR)_2$ and $Al(OR)_3$ with a polyhydroxy compound having 3 to 6 carbon atoms and 2 to 6 hydroxyl groups, where R is alkyl to $C_4$, said reaction taking place in the presence of an amount of water, in moles per gram atom of magnesium and aluminum, equal to about 6 to about 18 times the number of gram atoms of magnesium and aluminum charged divided by the number of hydroxyl equivalents of polyhydroxy compound charged.

3. The magnesium-aluminum complex of claim 2 wherein the amount of water, in moles per gram atom of magnesium and aluminum, is equal to about 12 times the number of gram atoms of magnesium and aluminum charged divided by the number of hydroxyl equivalents of polyhydroxy compound.

4. The magnesium-aluminum complex of claim 2 wherein the amount of water, in moles per gram atom of magnesium and aluminum, is equal to about 6 to about 12 times the number of gram atoms of magnesium and aluminum charged divided by the number of hydroxyl equivalents of polyhydroxy compound when the ratio of gram atoms of magnesium and aluminum to each hydroxyl group of the polyhydroxy compound is about 0.1 to about 0.5 and the amount of water, in moles per gram atom of magnesium and aluminum, is equal to about 12 to about 18 times the number of gram atoms of magnesium and aluminum charged divided by the number of hydroxyl equivalents of polyhydroxy compound when the ratio of gram atoms of magnesium and aluminum to each hydroxyl group of the polyhydroxy compound is about 0.5 to about 0.8.

5. The magnesium-aluminum complex of claim 2 wherein the ratio of magnesium to aluminum is between about 0.5 to about 2.

6. The magnesium-aluminum complex of claim 2 wherein said polyhydroxy compound is sorbitol.

7. The magnesium-aluminum complex of claim 2 wherein said magnesium alkoxide is magnesium ethoxide.

8. The magnesium-aluminum complex of claim 2 wherein said aluminum alkoxide is aluminum isopropoxide.

9. A process for producing a magnesium-aluminum complex of a polyhydroxy compound comprising reacting a magnesium alkoxide and an aluminum alkoxide with a polyhydroxy compound in the presence of water.

10. The process of claim 9 wherein the product of the reaction is dried and vacuum stripped at about 55 to about 90° C. and at less than about 1 mm. Hg.

11. A process of producing a magnesium-aluminum complex comprising reacting a magnesium alkoxide and an aluminum alkoxide having the respective formulae $Mg(OR)_2$ and $Al(OR)_3$ with a polyhydroxy compound having 3 to 6 carbon atoms and 2 to 6 hydroxyl groups, said reaction taking place in an amount of water, in moles per gram atom of magnesium and aluminum, equal to about 6 to about 18 times the number of gram atoms of magnesium and aluminum charged divided by the number of hydroxyl equivalents of polyhydroxy charged where R is alkyl to $C_4$.

12. The process of claim 11 wherein the amount of water, in moles per gram atom of magnesium and aluminum, is equal to about 12 times the number of gram atoms of magnesium and aluminum charged divided by the number of hydroxyl equivalents of polyhydroxy compound charged.

13. The process of claim 11 wherein said polyhydroxy compound is sorbitol.

14. The process of claim 11 wherein said magnesium alkoxide is magnesium ethoxide.

15. The process of claim 11 wherein said aluminum alkoxide is aluminum isopropoxide.

16. The process of claim 11 wherein said complex has a ratio of about 0.1 to about 0.8 gram atoms of magnesium and aluminum to each hydroxyl group of the polyhydroxy compound.

17. The process of claim 11 wherein the atomic ratio of magnesium to aluminum in the complex is between about 0.05 to about 10.

18. The process of claim 17 wherein the atomic ratio of magnesium to aluminum in the complex is between about 0.5 to about 2.

19. The process of claim 11 wherein a water-miscible solvent is present during the reaction.

20. The process of claim 19 wherein said water-miscible solvent is an alcohol.

References Cited

UNITED STATES PATENTS

| | | | |
|---|---|---|---|
| 2,397,732 | 4/1946 | Gaver | 260—209 |
| 3,198,332 | 8/1965 | Davison | 260—448 AD X |
| 3,352,895 | 11/1967 | Holbert et al. | 260—448 AD |
| 3,458,552 | 7/1969 | Hauck et al. | 260—448 AD |

FOREIGN PATENTS

| | | | |
|---|---|---|---|
| 261,377 | 2/1927 | Great Britain | 260—448 AD |
| 911,632 | 11/1962 | Great Britain | 260—448 AD |
| 961,299 | 6/1964 | Great Britain | 260—448 AD |

TOBIAS E. LEVOW, Primary Examiner

H. M. S. SNEED, Assistant Examiner

U.S. Cl. X.R.

252—431 R; 260—999